Patented Apr. 8, 1947

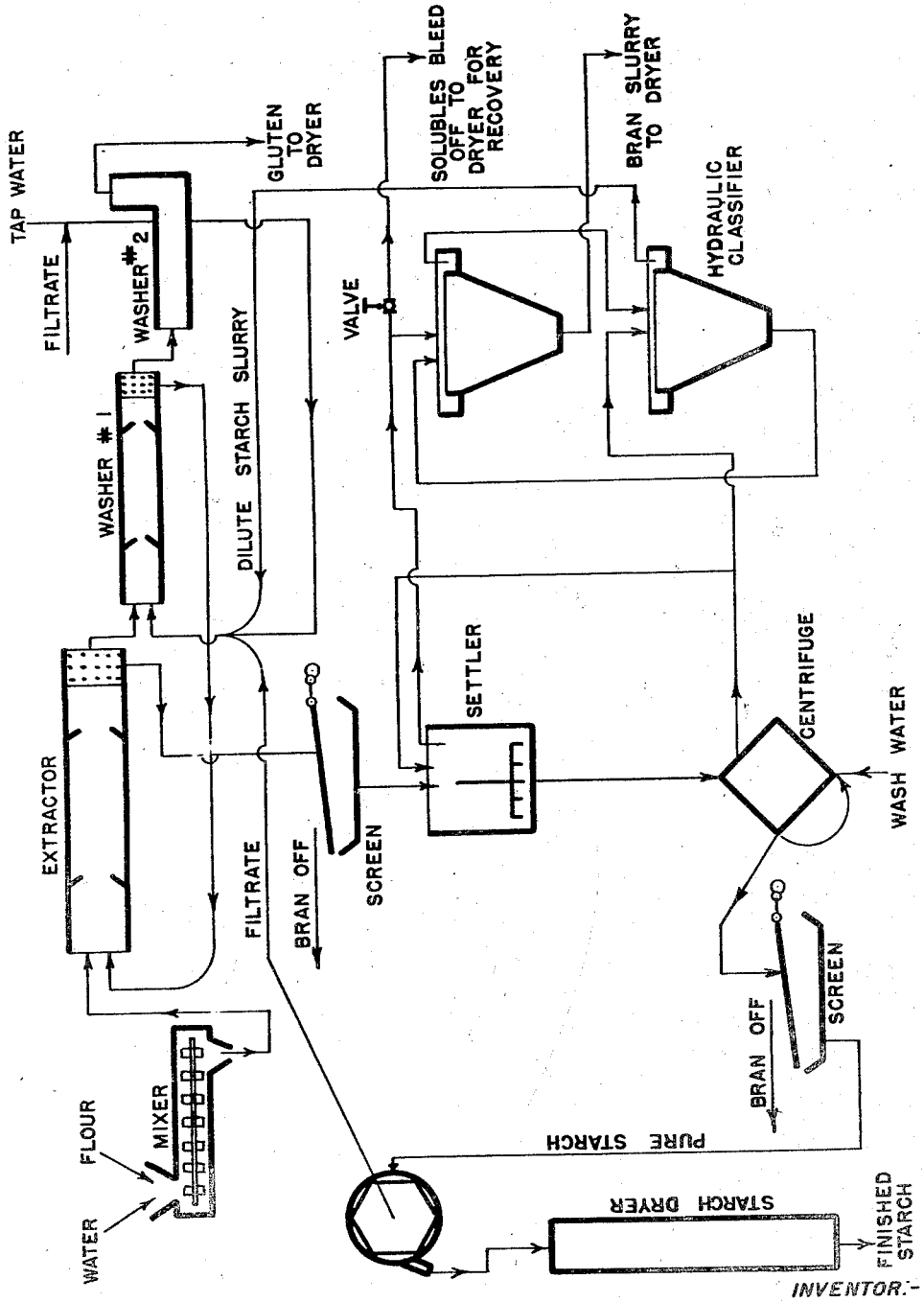

2,418,669

UNITED STATES PATENT OFFICE 2,418,669

WHEAT STARCH PROCESS

Richard H. Schilling, Minneapolis, Minn., assignor to General Mills, Inc., a corporation of Delaware Application August 4, 1943, Serial No. 497,407

3 Claims. (Cl. 127—67)

The present invention relates to a process for the preparation of starch and/or grain protein, and is particularly adapted to the separation of starch and/or gluten from wheat or milled wheat products.

In wet starch separation processes, difficulty is usually encountered as a result of fermentation which ensues from the action of the microbiological flora of the grain. In the conventional corn starch process sulfur dioxide is employed as an antiseptic to minimize this fermentation. The use of this material in a wheat starch process is not feasible since sufficient sulfur dioxide to inhibit microbial action drops the pH to a point where wheat gluten disperses and where starch settling is poor. Sulphites, moreover, have a dispersing effect upon wheat protein even at higher pH's. As a result, in the wheat process a satisfactory antiseptic is not available and fermentation takes place resulting in a lesser yield of a lower purity product.

Furthermore, where gluten is recovered as a separate product in a wheat flour separation process, it is extremely difficult to obtain a dried gluten product in undenatured form. Heretofore such an undenatured product could be obtained only by spray-drying a gluten dispersion or by vacuum drying the gluten material. Spray-drying requires a dilute dispersion in order for the material to pass through the sprays and consequently the cost of evaporating the large amount of water is high. Vacuum drying involves expensive equipment with low capacity and high process costs.

These difficulties of the prior art have been overcome by means of the present invention which involves the use of a nitrite, preferably sodium or potassium nitrite, in the starch and/or gluten separation process. It has been found that fermentation in wet starch can be minimized by means of these soluble nitrites. At the same time they automatically maintain pH at or near optimum for starch separations. The use of an antiseptic is particularly important in starch separation processes in which wet starch is maintained in the system for a prolonged period of time. Thus, for example, where impure starch slurries, wash water, and the like are recycled back to the process, the period during which starch is subjected to the action of microorganisms is extended greatly and the possibility of loss of product and contamination of product thereby is increased.

In separation of starch from gluten in wheat, it has been found that the nitrites perform an additional function in preventing denaturization of the gluten during the drying operation. Thus it may be dried on conventional equipment at atmospheric pressure and even at elevated temperatures without becoming denatured. Moreover, the nitrite appears to toughen the gluten in some manner so that the gluten mass coheres strongly and may be worked and worked vigorously for removal of starch without danger of disintegration and consequent loss of gluten and contamination of the starch.

The present invention therefore is of advantage in preventing starch fermentation and in assisting starch separation even though no gluten is involved in the process. Likewise, the present invention is of advantage for the treatment of gluten alone. Its greatest utility perhaps is in the separation of starch from gluten in wheat products such as, for example, flour, farina, meal, etc.

It is therefore the primary object of the present invention to provide a process of preparing starch in which a nitrite is used as an antiseptic.

It is a further object of the present invention to provide a process of preparing starch in which recycling of various starch-containing materials may be employed, fermentation being inhibited by the presence of a nitrite.

It is another object of the present invention to provide a process of making undenatured gluten by a wet separation method.

It is a still further object of the present invention to provide a novel, undenatured dry gluten product.

It is a further object of the invention to provide a process of toughening gluten so that it is less susceptible to breaking up while being washed for the removal of starch.

These and other objects of the invention will be apparent from the following detailed description of the invention, with reference to the drawing which shows a flow sheet of a starch process in which the present invention may be advantageously employed.

While the invention is broadly applicable to any wet starch separation process, it will be described with particular reference to the separation of starch from wheat as set forth in Callaghan and Elverum application Serial No. 383,678, filed March 17, 1941, and the application of Callaghan and Schilling, Serial No. 497,408, filed of even date herewith. According to these applications, flour and water are worked together to form a dough which is then worked until the gluten has become substantially completely agglomerated. By this it is meant that the dough is composed of a network of gluten fibers having starch particles in the interstices of the network. By obtaining this continuous network of gluten fibers before washing, the dough mass clings together during the washing operation and consequently there is practically no tendency for small particles of gluten to break off and separate with the starch. After the gluten has become agglomerated, the dough mass is discharged into a rotary drum and tumbled about relatively sharp projections in the drum in the presence of water to work the starch from the dough in the form of a slurry. This slurry is separated from the gluten mass by means of a suitable screen or sieve. The gluten discharged from the extraction drum is then discharged to any suitable number of washing drums where it is washed further. The washed gluten is then removed and dried and may be used for adhesive, plastics, human food, animal feeds, and the like. The starch slurry removed from the extraction drum may be suitably processed, as shown in the above-mentioned Callaghan and Schilling application, to recover the pure starch. In some of the embodiments of that application the starch flows are quite extended, particularly where ordinary gravity settling is employed to separate starch. Recycling of some of the slurries and of the wash water further extends the time period of contact between the starch and the inherent microorganisms.

The flow sheet shown in the drawing will serve to illustrate how the invention may be advantageously applied to a starch process. According to this flow sheet, flour and water are worked into a dough which is then worked until the gluten is agglomerated. The dough is then discharged to the extractor where it is worked in the presence of water removed from a later step in the process. In the extractor the starch is separated from the gluten in the form of a slurry which is withdrawn through a screen at the end of the extractor. The gluten is then discharged to a first washer and second washer. The slurry is screened for the removal of bran after which it is settled in order to prepare a concentrated starch slurry suitable for centrifugal separation. The concentrated slurry is then centrifuged and washed to yield a purified slurry which is filtered for the recovery of starch. The overflow from the centrifuge is subjected to hydraulic classification for the separation of bran from the fine starch particles. The fine starch slurry from the hydraulic classifier is then recycled back to the first gluten washer. Filtrate from the starch filter may be recycled either to the first or second gluten washer. It will be apparent from this drawing that a prolonged period of contact between the wet starch and the wheat flora may occur. This is true particularly of the long time period required for settling and classification and due to the fact that part of the material is recycled. It has been found that the addition of a small amount of a nitrite, such as sodium nitrite, for example in the concentration of .25 to 3.0 per cent, based on the weight of the flour fed to the system, will inhibit this microorganic action. In addiiton, the nitrite maintains the system at a pH which is within the optimum range for starch separation.

The predominant microorganisms in the natural wheat flora are lactobacilli and yeasts. These organisms ferment sugars to lactic acid and ethanol. Natural amylase present in the wheat converts starch to sugars for these organisms. As a result of the fermentation, carbon dioxide is evolved which upsets settling conditions. In addition the pH drops to a point below the optimum settling range. It has been found that a pH somewhere within the range of 5.0 to 6.0 is optimum for the settling of wheat starch. Natural lactic fermentation tends to lower the pH below 5. Nitrites appear to exercise a germicidal action at a pH between 5 and 6 and accordingly prevent any further lowering of the pH. As lactic fermentation decreases, there is a tendency for the pH to rise due to the alkaline characteristic of such nitrites as the alkali metal nitrites. As a result the pH rises above that at which the nitrite exercises germicidal action and accordingly lactic fermentation again ensues. It will be seen therefore that the nitrites not only inhibit microbiological action but also appear to automatically maintain the pH within a range suitable for separation of starch. It is to be pointed out that increasing the amount of nitrite present will raise the pH at which germicidal action occurs while decreasing the amount of nitrite lowers the pH at which germicidal action starts. Thus by varying the amounts of nitrite, varying ranges of pH can be automatically maintained. Thus the preservative action is in no sense limited to 5.0 to 6.0 pH.

With respect to the drawing, the nitrite may be added at any suitable point in the process, such as in the dough mixer, the extractor, or in the starch slurry. As was pointed out above, the presence of the nitrite prevents denaturization of gluten during the ordinary drying operation. If denatured gluten is desired, the nitrite may be added to the starch slurry separated from the extractor.

The wet gluten may be dried in any conventional manner. For example, it may be run through a conventional drum drier at atmospheric pressure and at an elevated temperature. If nitrite is present, the gluten will not be denatured even under these drastic conditions but a readily dispersible gluten will be obtained, which is particulaly suited as a coating or size for paper.

It will be apparent that the above description is merely exemplary and that the invention is not limited thereto but may be employed in any wet starch and/or gluten separation process. Likewise, the invention may be advantageously used in the separation of starch from any source and/or proteins from cereal grains.

It is desired to point out that the term "denaturization" has been used to indicate a result similar to the effect of heat on a protein such that it is no longer readily dispersible in ordinary media and no longer possesses the elastic properties of the original material. The material produced by the present invention possesses dispersion, elasticity and other characteristics approaching those of the original material, and accordingly it is believed that the term "undenatured" aptly describes the product.

I claim as my invention:

1. In a wet separation process of preparing starch from a wheat product containing gluten which comprises mixing water with the wheat product to separate a starch slurry from the gluten, and removing water from the starch slurry to recover starch, the step of inhibiting fermentation of the starch during the wet separation process by having a water soluble metal nitrite present during at least part of the wet separation process.

2. Process of separating wheat starch from gluten which comprises forming a dough containing starch, gluten and water, working the dough with water to form a mixture of gluten and a starch slurry, separating the starch slurry from the gluten, removing water from the starch slurry to recover starch, and inhibiting fermentation of the starch by having a water soluble metal nitrite present at least part of the time the starch is wet and in a normally fermentable condition.

3. Process of separating starch from gluten in a wheat product which comprises forming a dough containing starch, gluten and water, working the dough with water to form a mixture of gluten and a starch slurry, separating the starch slurry from the gluten, adding to the starch slurry a water soluble metal nitrite in an amount of from 0.25 to 3.0 percent based on the combined weight of the starch and gluten from which the slurry is derived, and removing water from the starch slurry to recover starch therefrom.

RICHARD H. SCHILLING.

REFERENCES CITED

The following references are of record in the file of this patent:

UNITED STATES PATENTS

| Number | Name | Date |
| --- | --- | --- |
| 1,259,377 | Doran | Mar. 12, 1918 |
| 2,223,387 | Scalise | Dec. 3, 1940 |
| 334,245 | Lauer | Jan. 12, 1886 |
| 1,888,785 | Berlin | Nov. 22, 1932 |
| 1,955,112 | Curry | Apr. 17, 1934 |

FOREIGN PATENTS

| Number | Country | Date |
| --- | --- | --- |
| 11,159 | British | 1907 |
| 2,251 | British | 1901 |